(12) United States Patent
Bhardwaj et al.

(10) Patent No.: US 10,084,207 B2
(45) Date of Patent: *Sep. 25, 2018

(54) SUBSTRATE FOR SOLID-STATE BATTERY

(71) Applicant: Google LLC, Mountain View, CA (US)

(72) Inventors: Ramesh C. Bhardwaj, Fremont, CA (US); Simon Prakash, Los Gatos, CA (US)

(73) Assignee: GOOGLE LLC, Mountain View, CA (US)

( * ) Notice: Subject to any disclaimer, the term of this patent is extended or adjusted under 35 U.S.C. 154(b) by 248 days.

This patent is subject to a terminal disclaimer.

(21) Appl. No.: 15/097,916

(22) Filed: Apr. 13, 2016

(65) Prior Publication Data
US 2016/0226105 A1  Aug. 4, 2016

(51) Int. Cl.
*H01M 10/0562* (2010.01)
*H01M 10/0585* (2010.01)
(Continued)

(52) U.S. Cl.
CPC ..... *H01M 10/0585* (2013.01); *H01M 4/0404* (2013.01); *H01M 4/0407* (2013.01); *H01M 4/0471* (2013.01); *H01M 4/1391* (2013.01); *H01M 4/382* (2013.01); *H01M 4/525* (2013.01); *H01M 4/661* (2013.01); *H01M 4/662* (2013.01);
(Continued)

(58) Field of Classification Search
CPC .......... H01M 4/0404; H01M 4/0471; H01M 4/1391; H01M 4/382; H01M 4/525; H01M 10/0585; H01M 10/0562
See application file for complete search history.

(56) References Cited

U.S. PATENT DOCUMENTS 8,304,115 B1    11/2012 Petkov et al.
2003/0152829 A1*  8/2003 Zhang ................. H01M 2/0275
                                                    429/153
(Continued)

FOREIGN PATENT DOCUMENTS

CN    101243563 A    8/2008
CN    102208651 A    10/2011
(Continued)

OTHER PUBLICATIONS

Communication and Supplementary European Search Report completed on Oct. 26, 2016, issued in connection with Patent Application No. EP 14818676.0, filed on Jun. 26, 2014, 8 pages.
(Continued)

*Primary Examiner* — Jonathan G Jelsma
(74) *Attorney, Agent, or Firm* — McDonnell Boehnen Hulbert & Berghoff LLP

(57) ABSTRACT

Disclosed are solid-state batteries having improved energy density and methods of manufacturing the solid-state batteries having improved energy density. In some embodiments, the solid-state battery may include a substrate of yttria-stabilized zirconia, a cathode current collector formed on the substrate, an anode current collector formed on the substrate, a cathode of lithium cobalt oxide in electrical contact with the cathode current collector, an anode of lithium in electrical contact with the anode current collector, and a solid-state electrolyte of lithium phosphorous oxynitride formed between the cathode and the anode.

18 Claims, 12 Drawing Sheets

(51) Int. Cl.
*H01M 4/38* (2006.01)
*H01M 4/525* (2010.01)
*H01M 10/04* (2006.01)
*H01M 10/052* (2010.01)
*H01M 4/04* (2006.01)
*H01M 4/66* (2006.01)
*H01M 10/0525* (2010.01)
*H01M 4/1391* (2010.01)
*H01M 6/40* (2006.01)

(52) U.S. Cl.
CPC ..... *H01M 10/0436* (2013.01); *H01M 10/052* (2013.01); *H01M 10/0525* (2013.01); *H01M 10/0562* (2013.01); *H01M 6/40* (2013.01); *H01M 2300/0068* (2013.01)

(56) References Cited

U.S. PATENT DOCUMENTS

| | | |
|---|---|---|
| 2004/0064937 A1 | 4/2004 | Krasnov et al. |
| 2006/0286448 A1 | 12/2006 | Snyder et al. |
| 2007/0218310 A1 | 9/2007 | Schuisky |
| 2008/0131356 A1 | 6/2008 | Kumar et al. |
| 2008/0263855 A1 | 10/2008 | Li et al. |
| 2009/0136839 A1 | 5/2009 | Kraznov et al. |
| 2009/0181303 A1 | 7/2009 | Neudecker et al. |
| 2010/0242265 A1 | 9/2010 | Wadley et al. |
| 2011/0031865 A1 | 2/2011 | Hussell et al. |
| 2011/0244365 A1 | 10/2011 | Ryu et al. |
| 2011/0281167 A1 | 11/2011 | Sabi et al. |
| 2011/0310530 A1 | 12/2011 | Laor |

FOREIGN PATENT DOCUMENTS

| | | |
|---|---|---|
| EP | 2426753 A1 | 3/2012 |
| JP | 2004-022250 A | 1/2004 |
| JP | 2009-509289 A | 3/2009 |
| JP | 2013-054999 A | 3/2013 |
| JP | 5182977 B1 | 4/2013 |
| JP | 2013062242 A | 4/2013 |
| KR | 10-2008-0033161 | 4/2008 |
| KR | 10-2011-0109104 | 10/2011 |
| WO | WO2012164642 A1 | 12/2012 |
| WO | WO2013125021 A1 | 8/2013 |

OTHER PUBLICATIONS

International Searching Authority, International Search Report and Written Opinion for PCT/US2014/044316 dated Oct. 15, 2014, 11 pages.

* cited by examiner

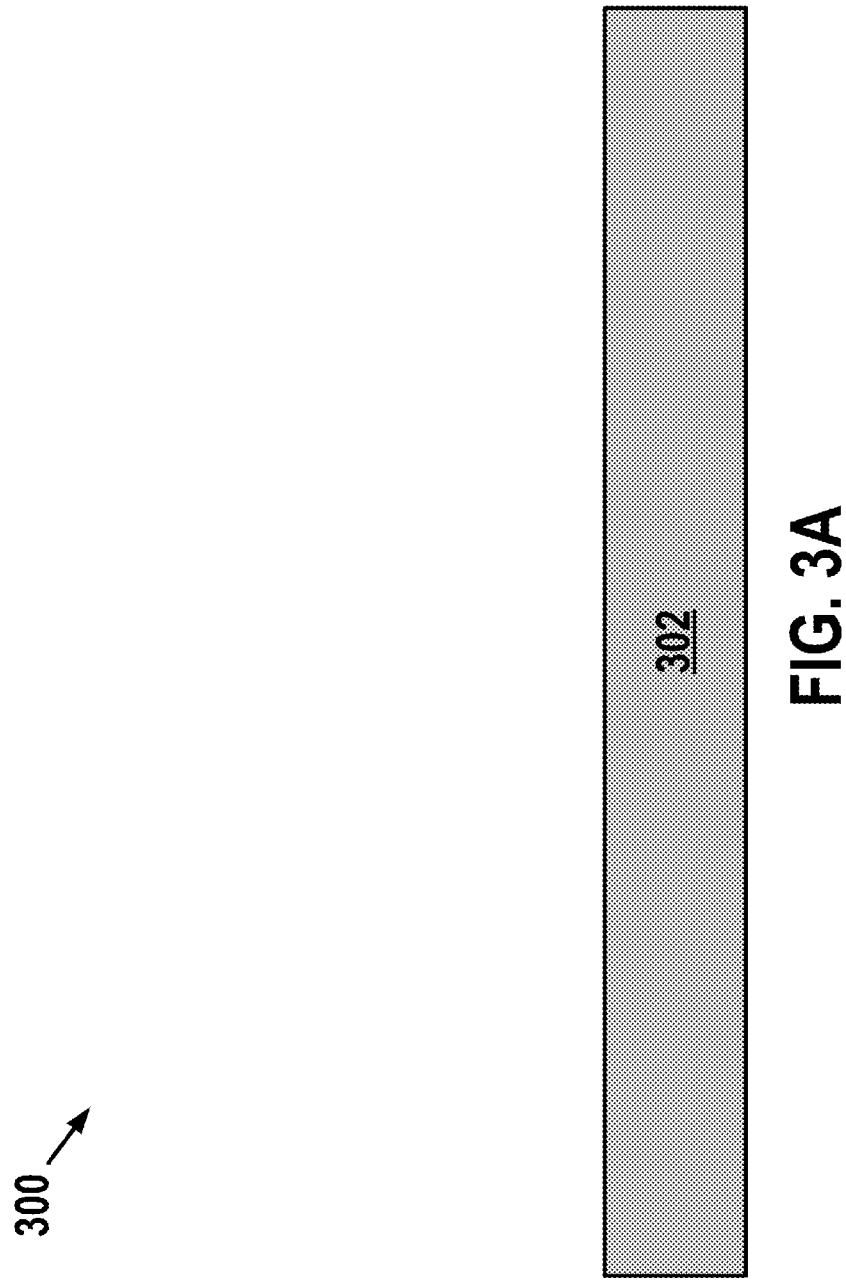

_US 10,084,207 B2_

SUBSTRATE FOR SOLID-STATE BATTERY

CROSS REFERENCE TO RELATED APPLICATION

This application claims priority under 35 U.S.C. § 120 to, and is a continuation of, U.S. patent application Ser. No. 13/930,109, filed on Jun. 28, 2013, entitled "Substrate For Solid-State Battery," which is incorporated herein by reference in its entirety.

BACKGROUND

Unless otherwise indicated herein, the materials described in this section are not prior art to the claims in this application and are not admitted to be prior art by inclusion in this section.

Conventional lithium-ion and lithium polymer batteries are typically composed of a lithium cobalt oxide ($LiCoO_2$) cathode, a graphite anode, a polymer separator, and a liquid electrolyte. One limitation of conventional lithium-ion and lithium polymer batteries is that the liquid electrolyte presents safety issues, as it may become flammable if a short occurs between the anode and cathode of such a battery due to, for example, a defect or mishandling. Another limitation of conventional lithium-ion and lithium polymer batteries is that, because such batteries have a high ratio of inactive (e.g., polymer separator, liquid electrolyte) to active materials (e.g., $LiCoO_2$ cathode and graphite anode), they have a limited energy density of approximately 500-550 Wh/L.

Solid-state batteries present an improvement over conventional lithium-ion and lithium polymer batteries in both energy density and safety. Solid-state batteries are typically composed of a $LiCoO_2$ cathode, a lithium anode, and a solid-state lithium phosphorous oxynitride (LiPON) electrolyte, which also acts as a separator. The lithium anode has a theoretical specific capacity of approximately 3800 mAh/g (as compared with the graphite anode used in lithium-ion and lithium polymer batteries, which has a theoretical specific capacity of only approximately 372 mAh/g), which allows for an increased energy density of solid-state batteries.

Because solid-state batteries use a solid-state electrolyte, rather than a liquid electrolyte, solid-state batteries do not present the safety issues that lithium-ion and lithium polymer batteries do. Additionally, solid-state batteries can have an energy density of approximately 1000 Wh/L.

SUMMARY

Disclosed are solid-state batteries formed on a substrate of yttria-stabilized zirconia (YSZ). In some embodiments, a solid-state battery may include a substrate of YSZ, a cathode current collector formed on the substrate, an anode current collector formed on the substrate, a cathode of lithium cobalt oxide ($LiCoO_2$) in electrical contact with the cathode current collector, an anode of lithium in electrical contact with the anode current collector, and a solid-state electrolyte of lithium phosphorous oxynitride (LiPON) formed between the cathode and the anode.

In some embodiments, the solid-state battery may be a double-sided solid-state battery. In these embodiments, each of the cathode collector, the anode collector, the cathode, the anode, and the solid-state electrolyte may be formed on a first side of the substrate. Additionally, a second cathode current collector, a second anode current collector, a second cathode, a second anode, and a second solid-state electrolyte may be formed on a second side of the substrate opposite the first side. The second cathode may be formed of $LiCoO_2$ and may be in electrical contact with the second cathode current collector. Further, the second anode may be formed of lithium and may be in electrical contact with the second anode current collector. Still further, the second solid-state electrolyte may be formed of LiPON and may be formed between the second cathode and the second anode.

Also disclosed are methods of manufacturing a solid-state battery that includes a substrate of YSZ. In some embodiments, a method may include providing a substrate of YSZ, forming on the substrate an anode current collector and a cathode current collector, and forming a cathode of $LiCoO_2$, where the cathode is in electrical contact with the cathode current collector. The method may further include annealing the cathode at a temperature between about 700° C. and about 800° C., forming a solid-state electrolyte of LiPON, and forming an anode of lithium, where the anode is in electrical contact with the anode current collector, and where the solid-state electrolyte is formed between the anode and the cathode.

Also disclosed are methods of manufacturing a number of solid-state batteries, each solid-state battery including a substrate of YSZ. In some embodiments, the method may include providing a roll including a number of substrates of YSZ and, for each substrate in the number of substrates: forming on the substrate an anode current collector and a cathode current collector, forming a cathode of $LiCoO_2$, where the cathode is in electrical contact with the cathode current collector, annealing the cathode at a temperature between about 700° C. and about 800° C., forming a solid-state electrolyte of LiPON, and forming an anode of lithium, where the anode is in electrical contact with the anode current collector, and where the solid-state electrolyte is formed between the anode and the cathode.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIGS. 3A-E illustrate a method of manufacturing a solid-state battery including an yttria-stabilized zirconia substrate, in accordance with some embodiments.

DETAILED DESCRIPTION

Figure 1A:
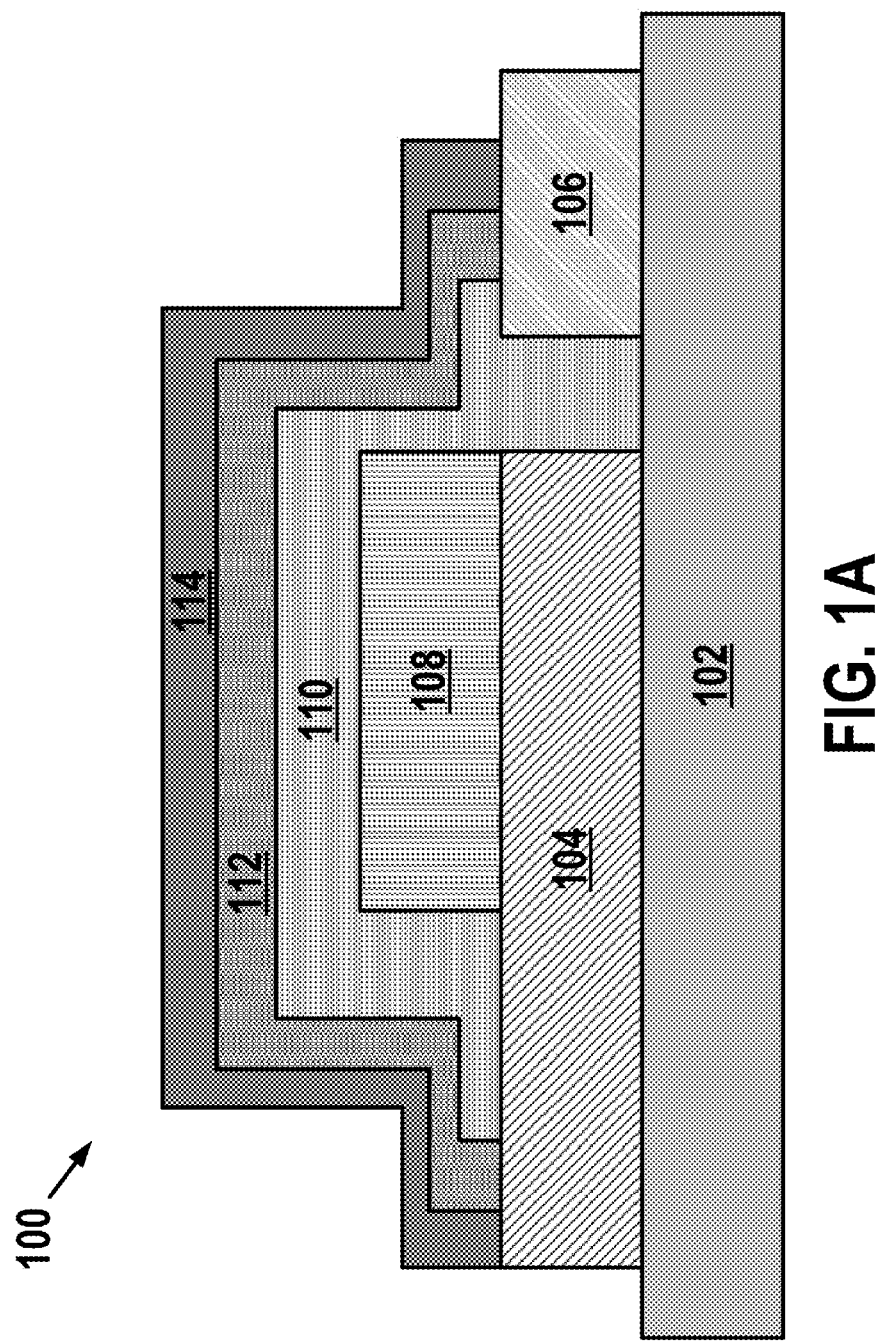
FIGS. 1A-B illustrate example solid-state batteries including yttria-stabilized zirconia substrates, in accordance with some embodiments.

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

Various substrate materials are currently used in solid-state batteries, including, for example, copper, stainless steel, and polyimide. However, solid-state batteries formed on each of these substrate materials typically exhibit limited energy densities on the order of approximately 97-150 Wh/L. These limited energy densities are the result of a number of factors.

First, the energy densities are limited by the annealing temperature that may be used during manufacture of the solid-state battery. To optimize the crystallization and crystal orientation of a lithium cobalt oxide ($LiCoO_2$) cathode (and, accordingly, the energy density of the solid-state battery), it may be desirable to anneal the $LiCoO_2$ cathode at a temperature between about 700° C. and about 800° C. However, polyimide substrates cannot withstand such high annealing temperatures; rather, polyimide is limited to an annealing temperature of approximately 400° C. Copper can withstand annealing temperatures of approximately 700-800° C., but with the result that the copper will oxidize during annealing. Further, while stainless steel can similarly withstand an annealing temperature of approximately 700-800° C., during annealing at such temperatures alloying elements in the stainless steel (e.g., chromium) migrate into the $LiCoO_2$ cathode, thereby reducing the cycle life of the solid-state battery.

The energy densities of solid-state batteries formed on copper, stainless steel, and polyimide substrates may be further limited by the mismatch between the coefficients of thermal expansion (CTEs) of the substrate materials and the CTE of $LiCoO_2$, which limits the thickness of the $LiCoO_2$ cathode that can be grown on each of these substrates. Growth of $LiCoO_2$ at greater thicknesses on these substrates results in cracking and peeling off of the $LiCoO_2$.

Disclosed are solid-state batteries formed on a substrate of yttria-stabilized zirconia (YSZ). YSZ is a flexible ceramic that can withstand annealing temperatures between about 700° C. and about 800° C., allowing for desirable annealing of $LiCoO_2$. Additionally, YSZ has a near-zero coefficient of thermal expansion at approximately 800° C., allowing for the growth of thicker layers of LiCoO2 without cracking or peeling of the $LiCoO_2$. As a result, solid-state batteries having a YSZ substrate may exhibit an improved energy density of approximately 1030 Wh/L.

FIG. 1A illustrates an example solid-state battery 100 including a YSZ substrate 102, in accordance with some embodiments. As shown, the solid-state battery 100 further includes a cathode current collector 104, an anode current collector 106, a cathode 108, a solid-state electrolyte 110, and an anode 112.

The substrate 102 may take any number of dimensions. In some embodiments, the substrate 102 may have a thickness between, for example, about 25 μm and about 40 μm. Other thicknesses are possible as well. The dimensions of the substrate 102, including, for example, a planar area and the thickness of the substrate 102, may vary by application of the solid-state battery 100.

A molar concentration of yttria in the YSZ of the substrate 102 may similarly vary by application. In some embodiments, the molar concentration of yttria in the YSZ may be, for example, approximately 3%. Other molar concentrations of yttria are possible as well.

In some embodiments, the substrate 102 may be a stand-alone layer of YSZ. Alternatively, in other embodiments, the substrate 102 may further include a layer of a metal or a ceramic. In these embodiments, the YSZ of the substrate 102 may be attached to the layer of the metal or the ceramic. The cathode current collector 104 and the anode current collector 106 may then be formed on the YSZ.

The cathode current collector 104 and the anode current collector 106 may each be formed of an electrically conductive material. For example, in some embodiments, one or both of the cathode current collector 104 and the anode current collector 106 may be formed of stainless steel and/or nickel. Alternatively or additionally, one or both of the cathode current collector 104 and the anode current collector 106 may take the form of a sheet, a foil, or a powder. Other cathode current collector and/or anode current collector materials and forms are possible as well. The cathode current collector 104 and the anode current collector 106 may each take any number of dimensions. In some embodiments, one or both of the cathode current collector 104 and the anode current collector 106 may have a thickness between, for example, about 3 μm and about 4 μm. Other thicknesses are possible as well. The dimensions of the cathode current collector 104 and the anode current collector 106, including, for example, planar areas and the thicknesses of the cathode current collector 104 and the anode current collector 106, may vary by application of the solid-state battery 100.

As shown, the cathode 108 is in electrical contact with the cathode current collector 104. The cathode 108 may be formed of, for example, $LiCoO_2$. Other cathode materials are possible as well. The cathode 108 may take any number of dimensions. In some embodiments, the cathode 108 may have a thickness between, for example, about 10 μm and about 15 μm. Other thicknesses are possible as well. In general, a greater thickness of the cathode 108 may be grown on the YSZ substrate 102 than on typical substrates of copper, polyimide, and stainless steel. Nevertheless, the dimensions of the cathode 108, including, for example, a planar area and thickness of the cathode 108, may vary by application of the solid-state battery 100.

As shown, the solid-state electrolyte 110 may be formed between the cathode 108 and the anode 112. In some embodiments, the solid-state electrolyte may be formed of lithium phosphorous oxide (LiPON). Other solid-state electrolyte materials are possible as well. The solid-state electrolyte 110 may take any number of dimensions. In some embodiments, the solid-state electrolyte 110 may have a thickness between, for example, about 2 μm and about 3 μm. Other thicknesses are possible as well. The dimensions of the solid-state electrolyte 110, including, for example, a planar area and the thickness of the solid-state electrolyte 110, may vary by application of the solid-state battery 100.

As shown, the anode 112 is in electrical contact with the anode current collector 106. The anode 112 may be formed of, for example, lithium. Other anode materials are possible as well. The anode 112 may take any number of dimensions. In some embodiments, the anode 112 may have a thickness between, for example, about 2 μm and about 3 μm. Other thicknesses are possible as well. The dimensions of the anode 112, including, for example, a planar area and the thickness of the anode 112, may vary by application of the solid-state battery 100.

In operation, when the solid-state battery 100 is connected into a circuit (such as, for example, the circuit of an electronic device), the solid-state battery 100 may power the circuit by means of a chemical reaction between the anode 112 and the cathode 108. In particular, when connected into the circuit, the anode 112 may undergo an oxidation reaction in which ions from the anode 112 move through the solid-state electrolyte 110 towards the cathode 108, resulting in the release of electrons from the anode 112 into the circuit. Concurrently, when connected into the circuit, the cathode 108 may undergo a reduction reaction in which the ions moving through the solid-state electrolyte 110 combine with the cathode 108, resulting in the absorption at the cathode 108 of the electrons released by the anode 112 into the circuit. The release of the electrons at the anode 112 and absorption of the electrons at the cathode 108 produces an electrical current that powers the circuit.

In some embodiments, the solid-state battery 100 may further include a protective coating 114, as shown. The protective coating 114 may, for example, substantially cover the anode 112, thereby protecting the solid-state battery 100 from contamination and extending the life of the solid-state battery 100. In some embodiments, the protective coating 114 may be formed of silicon dioxide ($SiO_2$), alumina, or a ceramic. Other protective coating materials are possible as well.

The solid-state battery 100 may take any number of dimensions. In some embodiments, for example, the solid-state battery 100 may have a thickness between about 30 μm and about 60 μm. Other thicknesses of the solid-state battery 100 are possible as well. The dimensions of the solid-state battery 100, including, for example, a planar area and the thickness of the solid-state battery 100, may vary by application of the solid-state battery 100.

Figure 1B:
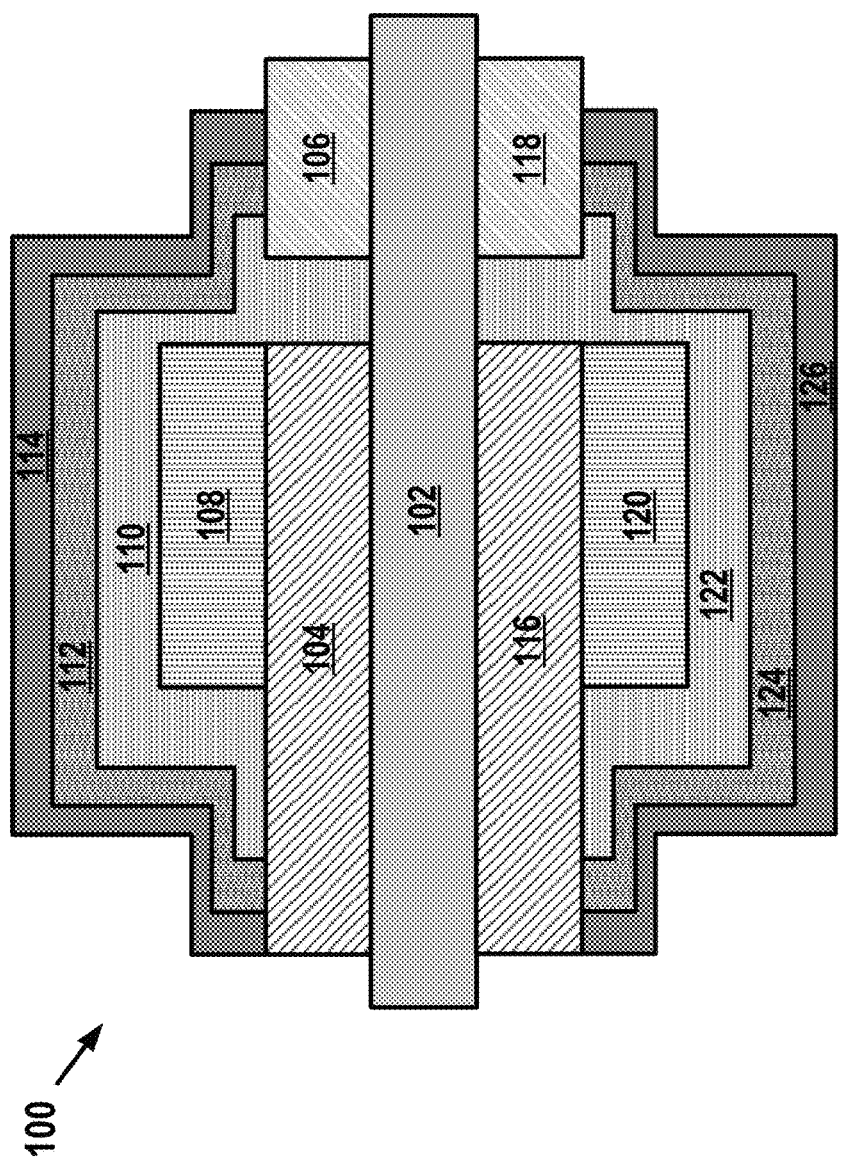

In some embodiments, in order to improve an energy density of the solid-state battery 100, it may be desirable for the solid-state battery 100 to be a double-sided solid-state battery, as shown in FIG. 1B. As shown, the double-sided solid-state battery 100 includes a second cathode current collector 116, a second anode current collector 118, a second cathode 120, a second solid-state electrolyte 122, and a second anode 124. The second cathode current collector 116, the second anode current collector 118, the second cathode 120, the second solid-state electrolyte 122, and the second anode 124 may take any of the forms described for the cathode current collector 104, the anode current collector 106, the cathode 108, the solid-state electrolyte 110, and the anode 112, respectively, in connection with FIG. 1A. In some embodiments, the solid-state battery 100 may further include a protective coating 126, as shown. The protective coating 126 may, for example, substantially cover the second anode 124, thereby protecting the solid-state battery 100 from contamination and extending the life of the solid-state battery 100. In some embodiments, the protective coating 126 may be formed of $SiO_2$, alumina, or a ceramic. Other protective coating materials are possible as well.

II. EXAMPLE METHODS FOR MANUFACTURING A SOLID-STATE BATTERY

Figure 2:
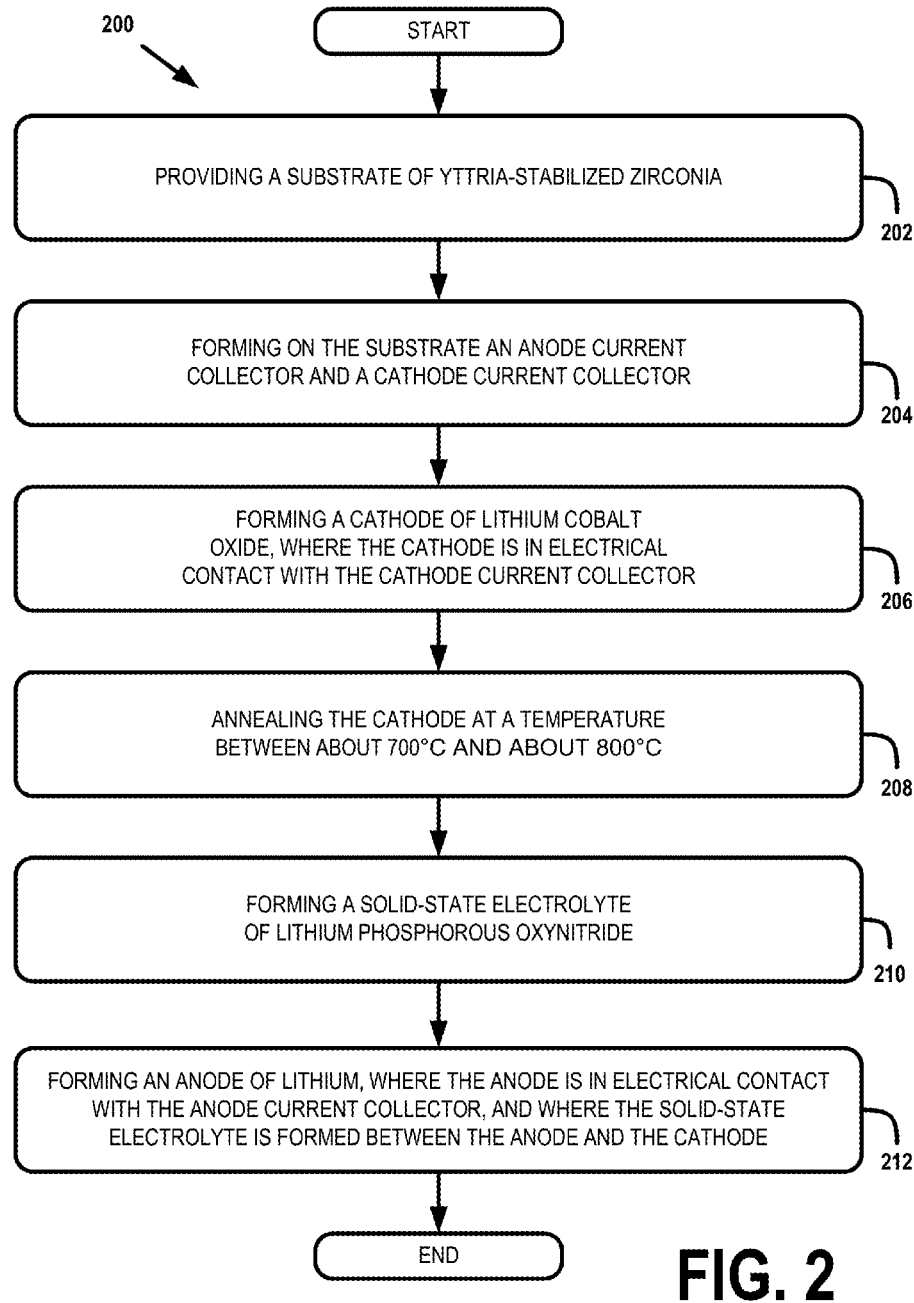
FIG. 2 is a flow chart describing a method of manufacturing a solid-state battery including an yttria-stabilized zirconia substrate, in accordance with some embodiments.

FIG. 2 is a flow chart describing a method 200 of manufacturing a solid-state battery including a YSZ substrate, in accordance with some embodiments.

As shown, the method 200 begins at block 202 with providing a substrate of YSZ. The substrate may, for example, take any of the forms described above for the substrate 102 in connection with FIG. 1A. In some embodiments, providing the substrate may involve manufacturing the YSZ substrate. Alternatively, in other embodiments, providing the substrate may involve acquiring a premanufactured substrate, such as the E-Strate® substrate manufactured by ENrG Inc. of Buffalo, N.Y. In either case, the substrate may be a stand-alone layer of YSZ, or may be a layer of YSZ attached to a layer of a metal or a ceramic. The substrate may be provided in other manners as well.

The method 200 continues at block 204 with forming on the substrate an anode current collector and a cathode current collector. The anode current collector may, for example, take any of the forms described above for the anode current collector 106 in connection with FIG. 1A. Similarly, the cathode current collector may, for example, take any of the forms described above for the cathode current collector 104 in connection with FIG. 1A. In some embodiments, one or both of the anode current collector and the cathode current collector may be preformed, and forming one or both of the anode current collector and the cathode current collector on the substrate may involve adhering the preformed anode and/or cathode current collector(s) to the substrate (e.g., using an adhesion layer between the substrate and the anode and/or cathode current collector(s)). Alternatively, in other embodiments, forming one or both of the anode current collector and the cathode current collector on the substrate may involve patterning (e.g., using lithography) the anode and/or cathode current collector(s) onto the substrate. The anode and/or cathode current collector(s) may be formed in other manners as well. The cathode current collector 104 and the anode current collector 106 may be formed concurrently or serially.

The method 200 continues at block 206 with forming a cathode of $LiCoO_2$, where the cathode is in electrical contact with the cathode current collector. The cathode may, for example, take any of the forms described above for the cathode 108 in connection with FIG. 1A. In some embodiments, forming the cathode may involve, for example, depositing (e.g., sputtering) $LiCoO_2$ on the cathode current collector to form the cathode. The cathode may be formed in other manners as well.

The method 200 continues at block 208 with annealing the cathode at a temperature between about 700° C. and about 800° C. Annealing in general serves to improve a crystallization and crystal orientation of the cathode, and annealing at a temperature between about 700° C. and about 800° C. may serve to improve the crystallization and crystal orientation of the cathode. As described above, the YSZ of the substrate can withstand the annealing temperature between about 700° C. and about 800° C. and has a near-zero coefficient of thermal expansion at approximately 800° C. As a result, the YSZ substrate allows annealing of the cathode at a temperature between about 700° C. and about 800° C. without damage to the cathode, resulting in an improved energy density of the solid-state battery of approximately 1030 Wh/L. The annealing may take place in, for example, an enclosed heating apparatus, such as a furnace, a rapid thermal annealing system, or a flash annealing system. The cathode may be annealed in other manners as well.

The method 200 continues at block 210 with forming a solid-state electrolyte of LiPON. The solid-state electrolyte may, for example, take any of the forms described above for the solid-state electrolyte 110 in connection with FIG. 1A. In some embodiments, forming the solid-state electrolyte may involve, for example, forming the solid-state electrolyte using physical vapor deposition. For instance, the solid-state electrolyte may be formed by positioning the substrate in a vacuum chamber facing a target of lithium phosphate ($Li_3PO_4$) and introducing nitrogen into the chamber, thereby forming a plasma facilitating deposition (e.g., sputtering) of LiPON. The solid-state electrolyte may be formed in other manners as well.

The method 200 continues at block 212 with forming an anode of lithium, where the anode is in electrical contact with the anode current collector, and where the solid-state electrolyte is formed between the anode and the cathode. The anode may, for example, take any of the forms described above for the anode 112 in connection with FIG. 1A. In some embodiments, forming the anode may involve, for example, depositing (e.g., sputtering) lithium on the anode current collector and the solid-state electrolyte to form the cathode. The anode may be formed in other manners as well.

In some embodiments, the method 200 may further include forming a protective coating that substantially covers the anode. The protective coating may, for example, take any of the forms described above for the protective coating 114 in connection with FIG. 1A. In other embodiments, no protective coating may be formed.

FIGS. 3A-E illustrate a method of manufacturing a solid-state battery including a YSZ substrate, in accordance with some embodiments. The method may be, for example, the method 200 described above in connection with FIG. 2.

As shown in FIG. 3A, a substrate 302 of YSZ is provided. The substrate 302 may take any of the forms described above for the substrate 102 in connection with FIG. 1A, and may be provided in any of the manners described above for block 202 in connection with FIG. 2.

Figure 3B:
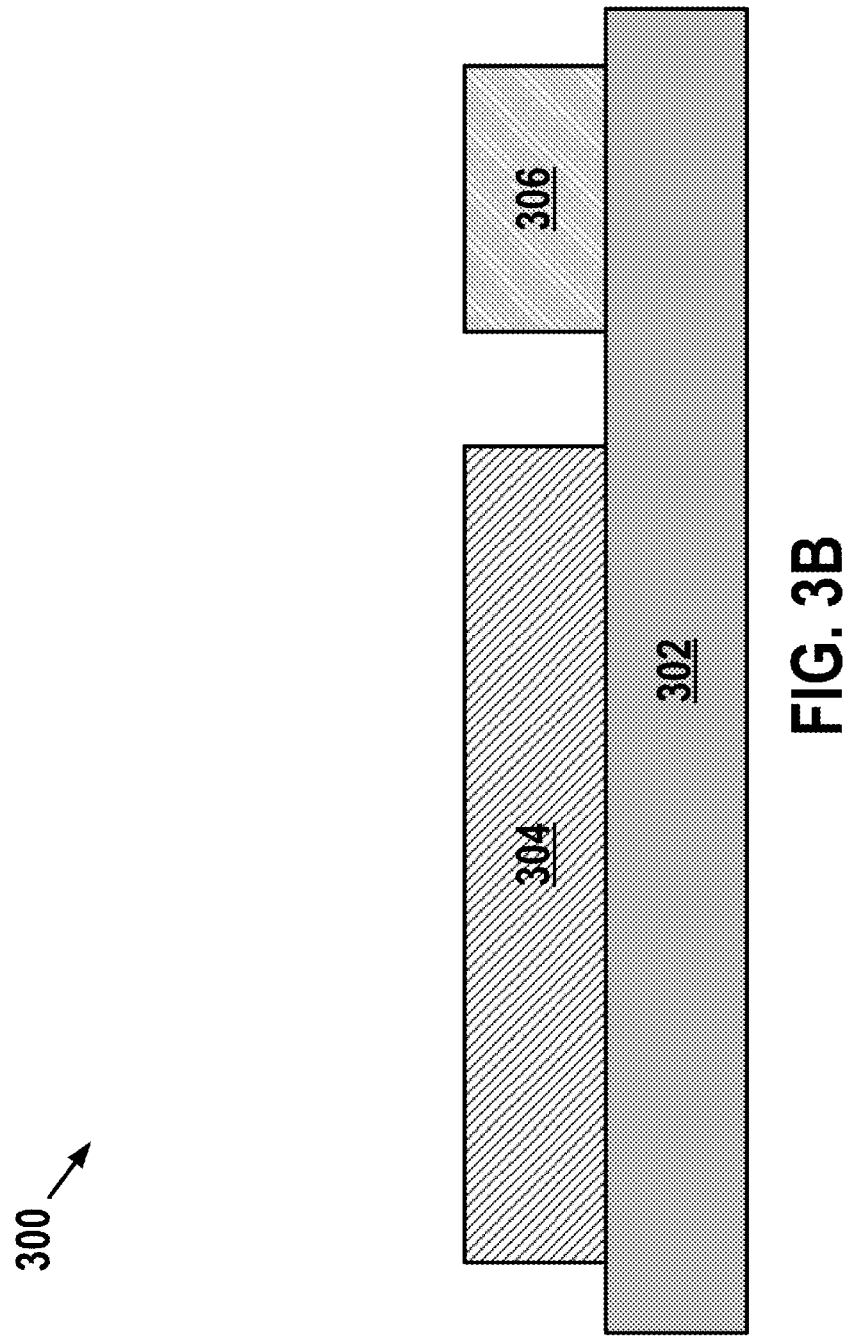

FIG. 3B illustrates the forming of a cathode current collector 304 and an anode current collector 306 on the substrate. The cathode current collector 304 and the anode current collector 306 may take any of the forms described above for the cathode current collector 104 and the anode current collector 106, respectively, in connection with FIG. 1A. Further, the cathode current collector 304 and the anode current collector 304 may be formed in any of the manners described above for block 204 in connection with FIG. 2.

Figure 3C:
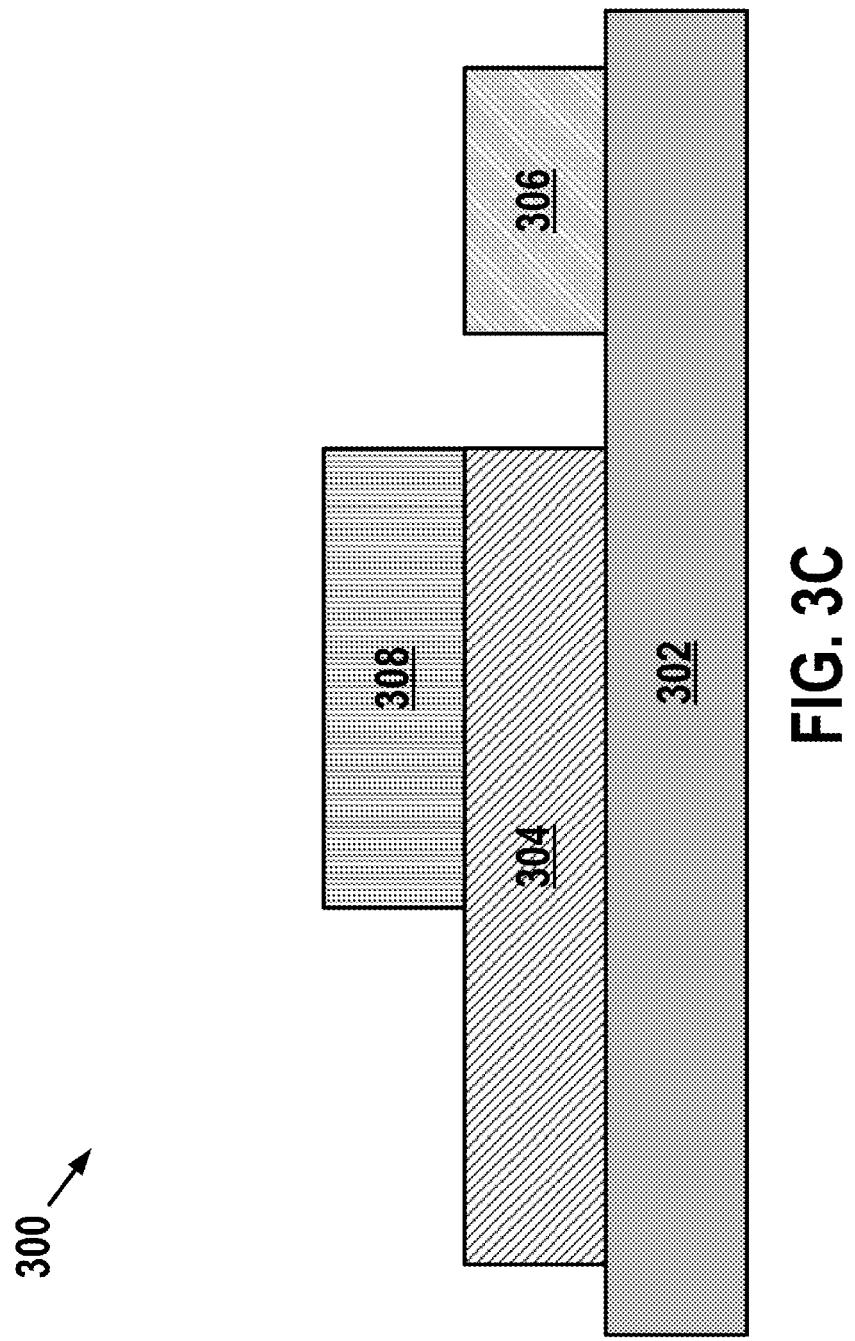

FIG. 3C illustrates the forming of a cathode 308 of $LiCoO_2$. As shown, the cathode 308 is in electrical contact with the cathode current collector 304. The cathode 308 may take any of the forms described above for the cathode 108 in connection with FIG. 1A. Further, the cathode 308 may be formed in any of the manners described above for block 206 in connection with FIG. 2. Additionally, the cathode 308 may be annealed (not shown) in any of the manners described above for block 208 in connection with FIG. 2.

Figure 3D:
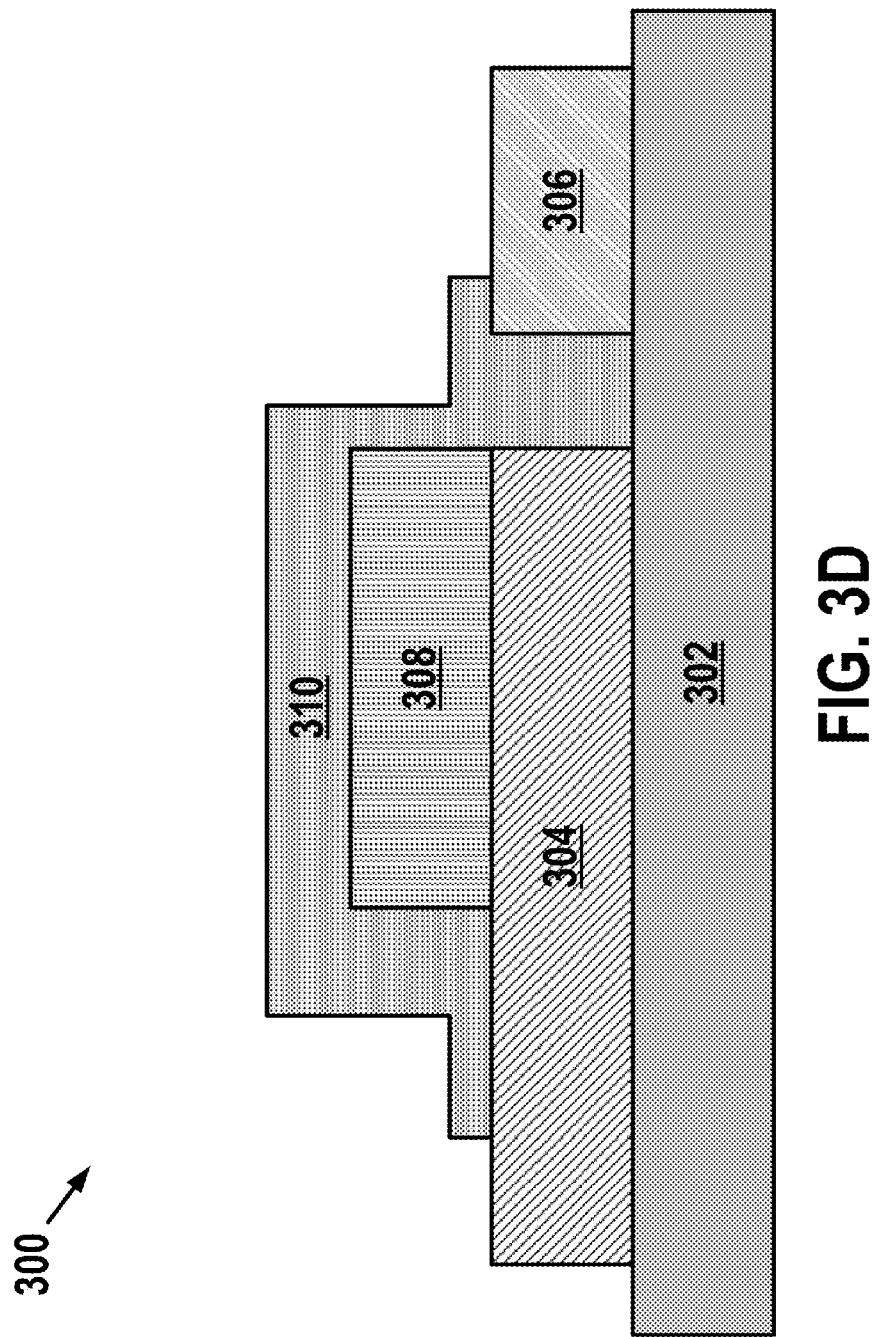

FIG. 3D illustrates the forming of a solid-state electrolyte 310 of LiPON. The solid-state electrolyte 310 may take any of the forms described above for the solid-state electrolyte 110 in connection with FIG. 1A. Further, the solid-state electrolyte may be formed in any of the manners described above for block 210 in connection with FIG. 2.

Figure 3E:
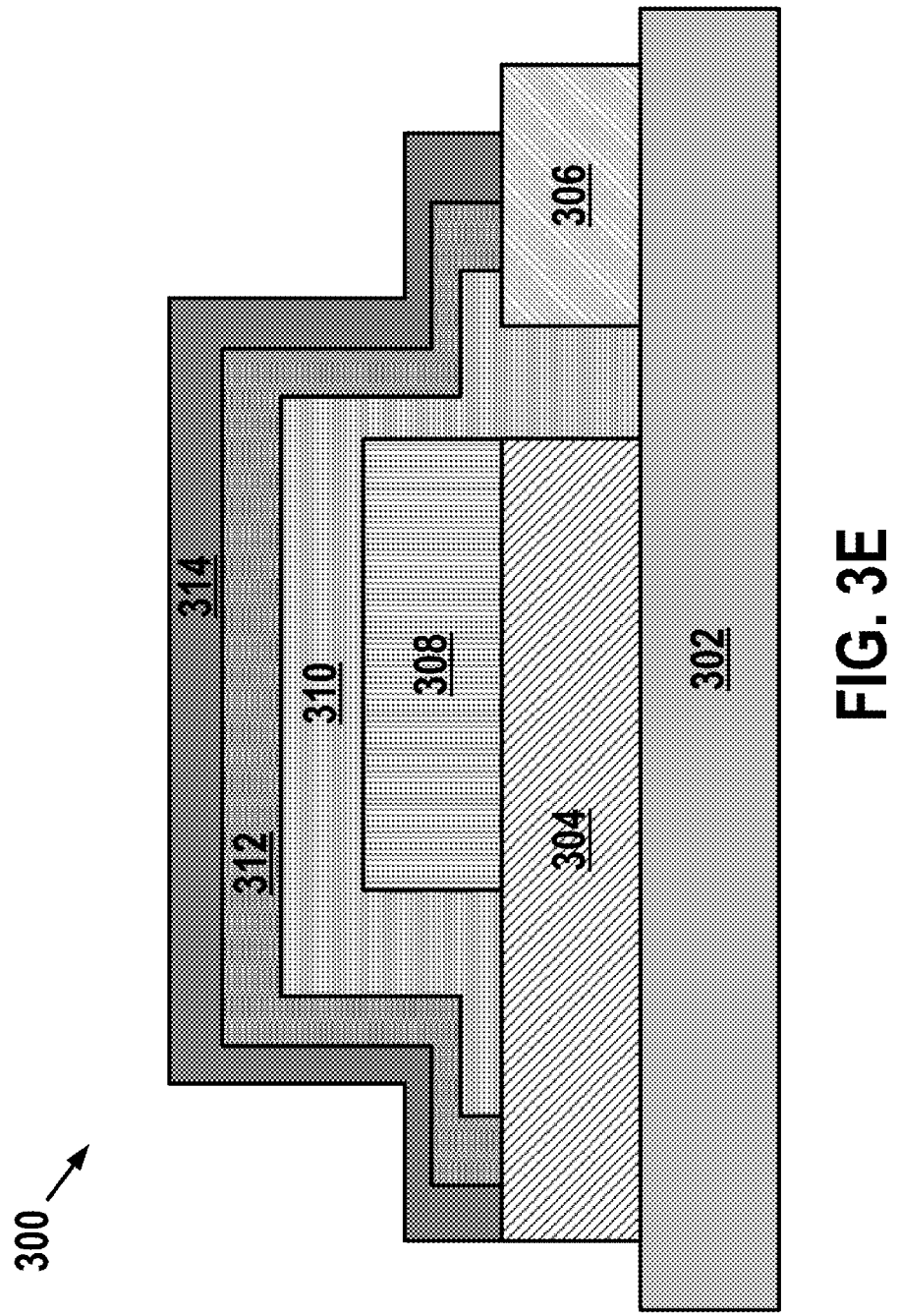

FIG. 3E illustrates the forming of an anode 312 of lithium. As shown, the anode 312 is in electrical contact with the anode current collector 306. Additionally, as shown, the solid-state electrolyte 310 is formed between the cathode 308 and the anode 312. The anode 312 may take any of the forms described above for the anode 112 in connection with FIG. 1A. Further, the anode 312 may be formed in any of the manners described above for block 212 in connection with FIG. 2.

As shown, a protective coating 314 may additionally be formed that substantially covers the anode. The protective coating 314 may, for example, take any of the forms described above for the protective coating 114 in connection with FIG. 1A. In some embodiments, no protective coating 314 may be formed.

III. EXAMPLE METHODS FOR MANUFACTURING A NUMBER OF SOLID-STATE BATTERIES

In some applications, it may be desirable to manufacture a number of solid-state batteries in a single manufacturing process, rather than individually. To this end, the disclosed solid-state batteries may be manufactured using a roll-to-roll manufacturing process, in which a flexible roll including a number of substrates is patterned (e.g., using lithography and/or inkjet printing) and/or adhered to one or more other rolls to form a solid-state battery from each of the number of substrates. The number of substrates may then be separated from one another to produce a number of solid-state batteries.

Figure 4:
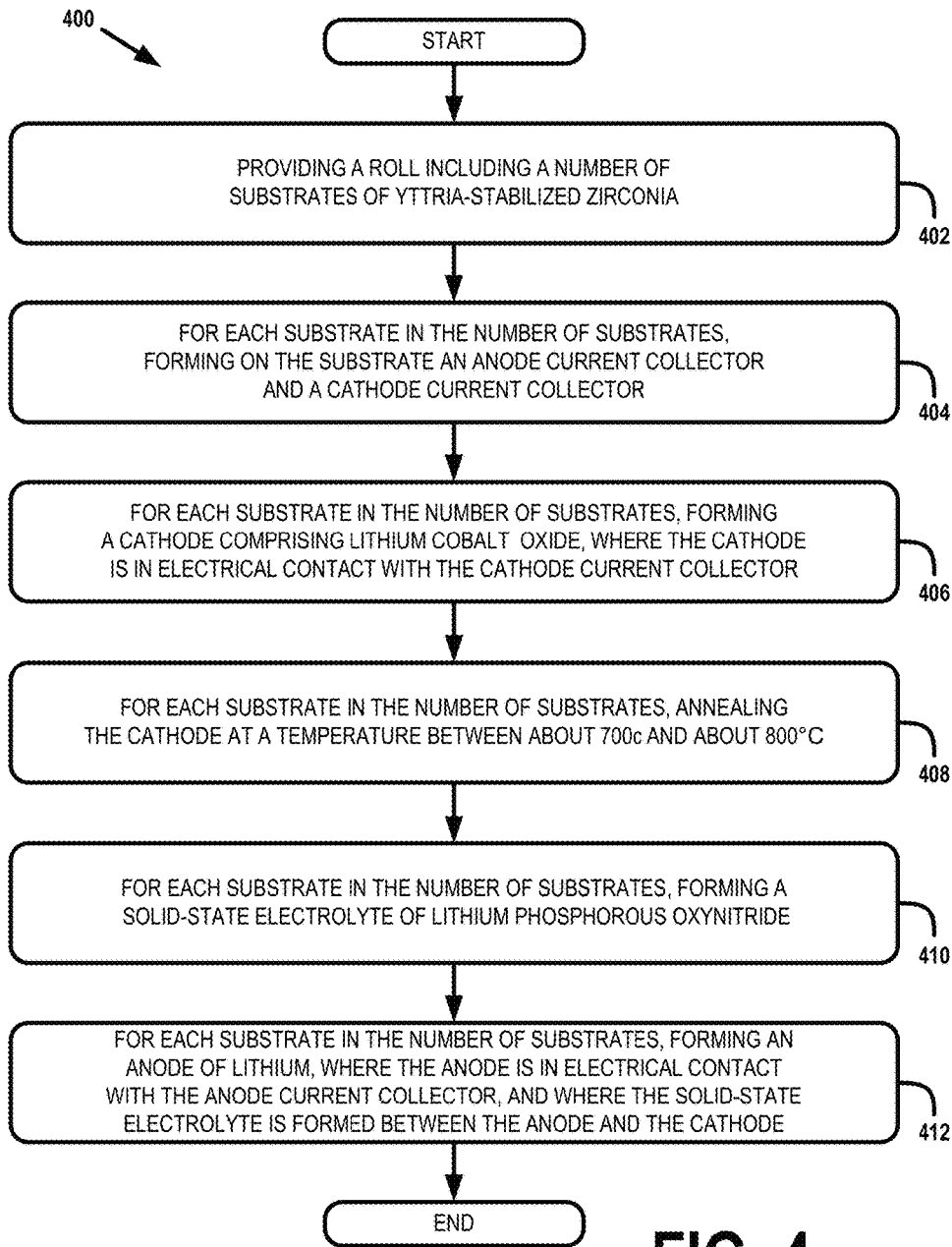
FIG. 4 is a flow chart describing a method of manufacturing a number of solid-state batteries, each of which includes an yttria-stabilized zirconia substrate, in accordance with some embodiments.

FIG. 4 is a flow chart describing a method 400 of manufacturing a number of solid-state batteries, each of which includes a YSZ substrate, in accordance with some embodiments. As shown, the method 400 begins at block 402 with providing a roll including a number of substrates of YSZ. The roll may take any number of dimensions. In some embodiments, the roll may have a thickness between, for example, about 25 µm and about 40 µm. Other thicknesses are possible as well. Further, in some embodiments, the roll may have a planar length and/or planar width on the order of meters. The dimensions of the roll, including, for example, the planar area and the thickness of the roll, may vary by application of the solid-state batteries to be manufactured.

The roll may take any of the forms described above for the substrate 102 in connection with FIG. 1A. For example, in some embodiments, the roll may be formed of a layer of YSZ. In these embodiments, each substrate in the number of substrates may be formed by a region of the roll. As another example, in some embodiments, the roll may be a layer of YSZ attached to a layer of a metal or ceramic. In these embodiments, each substrate in the number of substrates may be formed by a region of the roll. The roll may take other forms as well. Any number of substrates may be included in the roll, and the substrates may be arranged in any pattern.

The method 400 continues at block 404 with, for each substrate in the number of substrates, forming on the substrate an anode current collector and a cathode current collector. Each anode current collector may, for example, take any of the forms described above for the anode current collector 106 in connection with FIG. 1A. Similarly, each cathode current collector may, for example, take any of the forms described above for the cathode current collector 104 in connection with FIG. 1A. Each anode current collector and cathode current collector may be formed in any of the manners described above for block 204 in connection with FIG. 2. Alternatively, each anode current collector and cathode current collector may be formed through patterning (e.g., lithography and/or inkjet printing) and/or may be preformed on an additional roll that is rolled over and adhered to the roll including the substrates. The anode current collectors and cathode current collectors may be formed in other manners as well. The anode current collectors and the cathode current collectors may be formed concurrently, serially, and/or in groups.

The method 400 continues at block 406 with, for each substrate in the number of substrates, forming a cathode of $LiCoO_2$, where the cathode is in electrical contact with the cathode current collector. Each cathode may take any of the forms described above for the cathode 108 in connection with FIG. 1A. Further, each cathode may be formed in any of the manners described above for block 206 in connection with FIG. 2. Alternatively, each cathode may be formed through patterning (e.g., lithography and/or inkjet printing) and/or may be preformed on an additional roll that is rolled over and adhered to the roll including the substrates. The cathodes may be formed in other manners as well. The cathodes may be formed concurrently, serially, and/or in groups.

The method 400 continues at block 408 with, for each substrate in the number of substrates, annealing the cathode at a temperature between about 700° C. and about 800° C. Each cathode may be annealed in any of the manners described above for block 208 in connection with FIG. 2. The cathodes may be annealed concurrently, serially, and/or in groups.

The method 400 continues at block 410 with, for each substrate in the number of substrates, forming a solid-state electrolyte of LiPON. Each solid-state electrolyte may take any of the forms described above for the solid-state electrolyte 110 in connection with FIG. 1A. Further, each solid-state electrolyte may be formed in any of the manners described above for block 210. Alternatively, each solid-state electrolyte may be formed through patterning (e.g., lithography and/or inkjet printing) and/or may be preformed on an additional roll that is rolled over and adhered to the roll including the substrates. The solid-state electrolytes may be formed in other manners as well. The solid-state electrolytes may be formed concurrently, serially, and/or in groups.

The method 400 continues at block 412 with, for each substrate in the number of substrates, forming an anode of lithium, where the anode is in electrical contact with the anode current collector and where the solid-state electrolyte is formed between the anode and the cathode. Each anode may take any of the forms described above for the anode 112 in connection with FIG. 1A. Further, each anode may be formed in any of the manners described above for block 212 in connection with FIG. 2. Alternatively, each anode may be formed through patterning (e.g., lithography and/or inkjet printing) and/or may be preformed on an additional roll that is rolled over and adhered to the roll including the substrates. The cathodes may be formed in other manners as well. The anodes may be formed concurrently, serially, and/or in groups.

In some embodiments, the method 400 may further include, for each substrate in the number of substrates, forming a protective coating substantially covering the anode. The protective coating may, for example, take any of the forms described above for the protective coating 114 in connection with FIG. 1A. In some embodiments, each protective coating may be formed through patterning (e.g., lithography and/or inkjet printing) and/or may be preformed on an additional roll that is rolled over and adhered to the roll including the substrates. The protective coatings may be formed in other manners as well. The protective coatings may be formed concurrently, serially, and/or in groups. Alternatively, in some embodiments, no protective coating may be formed.

In some embodiments, the method 400 may further include separating each of the substrates in the number of substrates from one another, thereby forming a number of solid-state batteries. Each solid-state battery may include a respective substrate. The substrates may be separated using, for example, die cutting and/or laser cutting. The substrates may be separated in other manners as well.

Figure 5A:
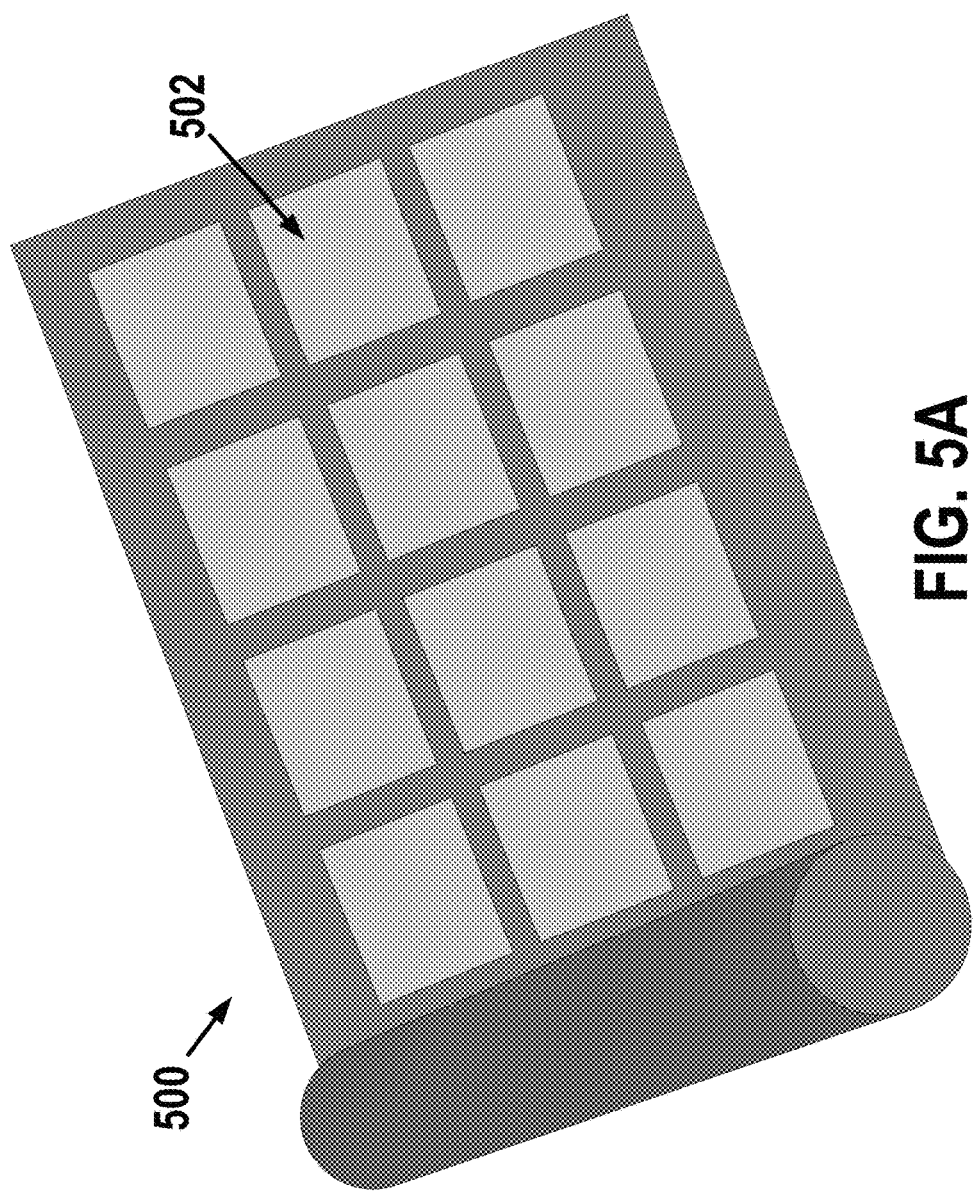
FIGS. 5A-C illustrate a method of manufacturing a number of solid-state batteries, each of which includes an yttria-stabilized zirconia substrate, in accordance with some embodiments.
Figure 5B:
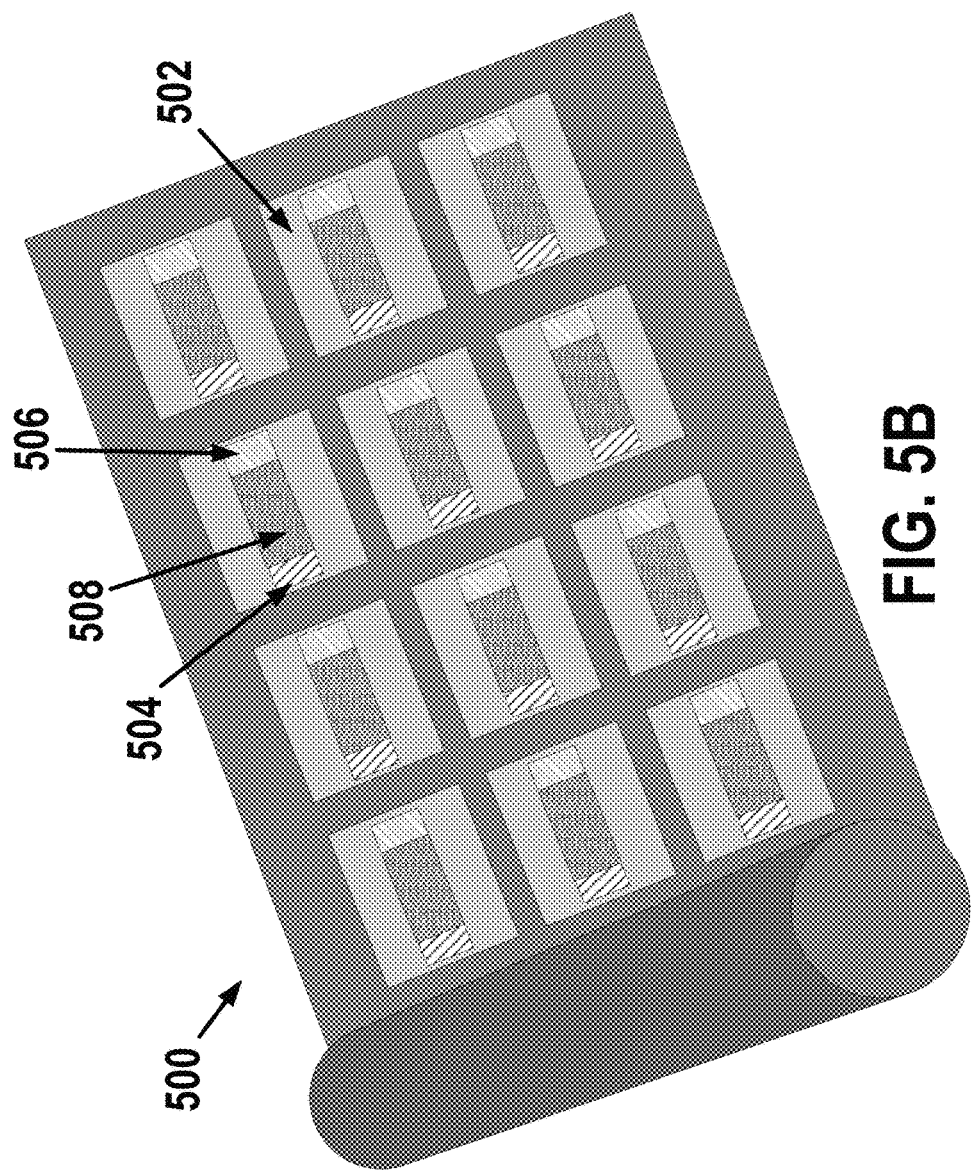
Figure 5C:
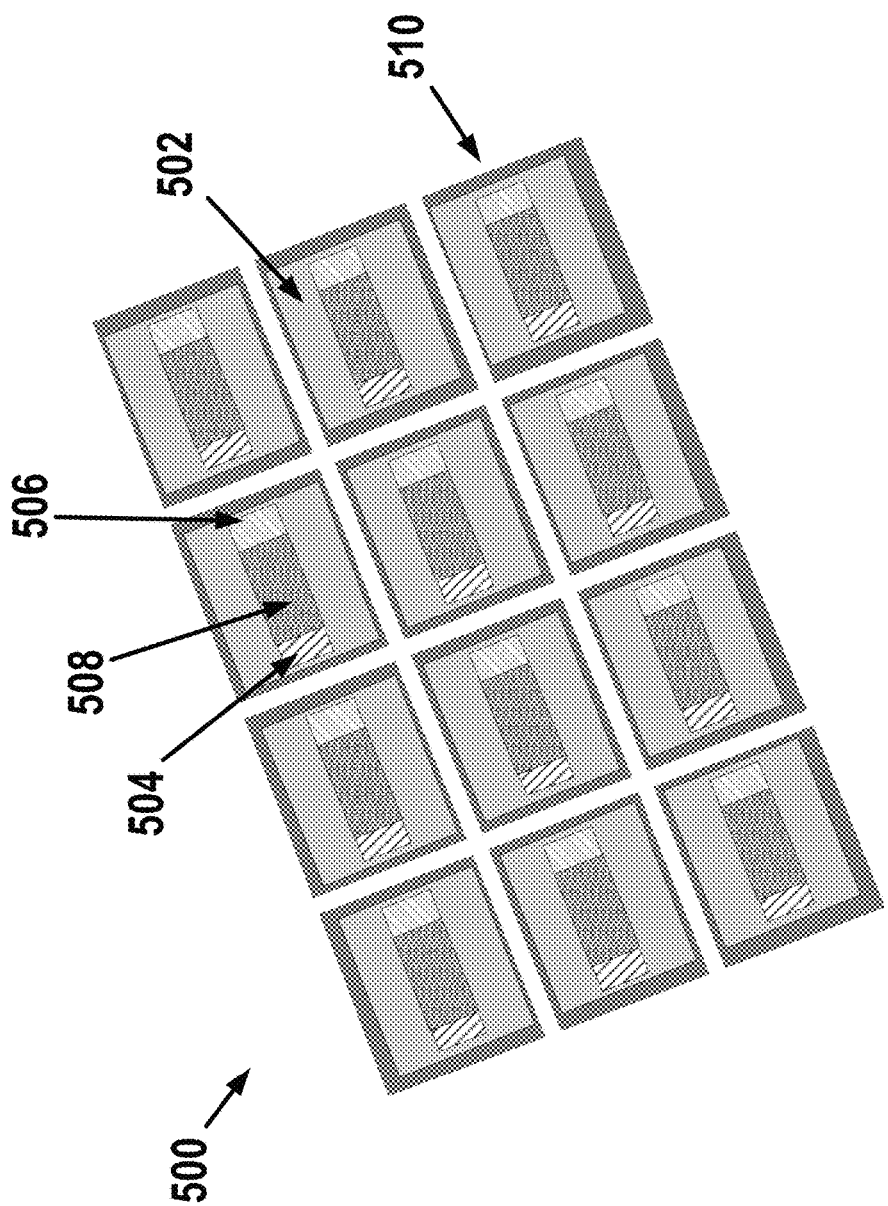

FIGS. 5A-C illustrate a method of manufacturing a number of solid-state batteries, each of which includes a YSZ substrate, in accordance with some embodiments. The method may be, for example, the method 400 described above in connection with FIG. 4.

As shown in FIG. 5A, a roll 500 may be provided that includes a number of substrates 502. In some embodiments, the roll 500 may be formed of a layer of YSZ. In these embodiments, each substrate in the number of substrates 502 may be formed by a region of the roll 500. As another example, in some embodiments, the roll 500 may be a layer of YSZ attached to a layer of a metal or ceramic. In these embodiments, each substrate in the number of substrates 502 may be formed by a region of the roll 500. The roll 500 may take other forms as well. Any number of substrates may be included in the roll 500, and the substrates may be arranged in any pattern.

As shown in FIG. 5B, a solid-state battery may be formed on each substrate in the number of substrates 502. In particular, for each substrate, a cathode current collector 504, an anode current collector 506, a cathode (not visible from the top view), a solid-state electrolyte (not visible from the top view), and an anode 508 may be formed. Each of the cathode current collector 504, the anode current collector 506, the cathode, the solid-state electrolyte, and the anode 508 may take any of the forms described above for the cathode current collector 104, the anode current collector 106, the cathode 108, the solid-state electrolyte 110, and the anode 112, respectively, in connection with FIG. 1A. Further, each of the cathode current collector 504 and the anode current collector 506 may be formed in any of the manners described above for block 404 in connection with FIG. 4. Moreover, each of the cathode, the solid-state electrolyte, and the anode 508 may be formed in any of the manners described above for blocks 406, 410, and 412, respectively, in connection with FIG. 4. One or more of the cathode current collector 504, the anode current collector 506, the cathode, the solid-state electrolyte, and the anode 508 may be formed during the same manufacturing step, or each may be formed during a separate manufacturing step.

In some embodiments, a protective coating (not shown) may additionally be formed that substantially covers each of the anodes 508. The protective coating may, for example, take any of the forms described above for the protective coating 114 in connection with FIG. 1A. In other embodiments, such as that shown, no protective coating may be formed.

In any case, each cathode current collector 504, anode current collector 506, cathode, solid-state electrolyte, and anode 508, together with the substrate on which they are formed, may form a solid-state battery. The solid-state batteries may then be separated, as shown in FIG. 5C. Each of the solid-state batteries 510 may include a respective substrate. The solid-state batteries 510 may be separated using, for example, die cutting and/or laser cutting. The solid-state batteries 510 may be separated in other manners as well.

While the solid-state batteries 510 in FIG. 5C are shown from a top view, each solid-state battery may appear from a side view to be similar to the solid-state battery 100 described above in connection with FIG. 1A. (While the solid-state battery 100 in FIG. 1A is shown to include a protective coating 114, each of the solid-state batteries 510 may or may not include a protective coating, as described above.)

In some embodiments, in order to improve an energy density of the solid-state batteries 510, it may be desirable for the solid-state batteries 510 to be double-sided solid-state batteries. Each double-sided solid-state battery may include a second cathode current collector, a second anode current collector, a second cathode, a second solid-state electrolyte, and a second anode. The second cathode current collector, the second anode current collector, the second cathode, the second solid-state electrolyte, and the second anode may take any of the forms described above for the cathode current collector 104, the anode current collector 106, the cathode 108, the solid-state electrolyte 110, and the anode 112, respectively, in connection with FIG. 1A. From a side view, each of the double-sided solid-state batteries 510 may appear to be similar to the double-sided solid-state battery 100 described above in connection with FIG. 1B. (While the solid-state battery 100 in FIG. 1B is shown to include protective coatings 114 and 126, each of the double-sided solid-state batteries 510 may or may not include a protective coating, as described above.)

IV. CONCLUSION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for forming a solid-state battery on a substrate comprising a layer of yttria-stabilized zirconia (YSZ), the method comprising:
    forming a first cathode current collector in contact with a first side of the layer of YSZ;
    forming a first anode current collector in contact with the first side of the layer of YSZ;
    forming a first cathode comprising lithium cobalt oxide ($LiCoO_2$) in electrical contact with the first cathode current collector;
    forming a first anode comprising lithium in electrical contact with the first anode current collector;
    forming a first solid-state electrolyte comprising lithium phosphorous oxynitride (LiPON) between the first cathode and the first anode;
    forming a second cathode current collector in contact with a second side of the layer of YSZ that is opposite the first side;
    forming a second anode current collector in contact with the second side of the layer of YSZ;
    forming a second cathode comprising $LiCoO_2$ in electrical contact with the second cathode current collector;
    forming a second anode comprising lithium in electrical contact with the second anode current collector; and
    forming a second solid-state electrolyte comprising LiPON between the second cathode and the second anode.

2. The method of claim 1, wherein the layer of YSZ has a thickness between about 25 μm and about 40 μm.

3. The method of claim 1, wherein the first cathode has a thickness between about 10 μm and about 15 μm.

4. The method of claim 1, wherein the second cathode has a thickness between about 10 μm and about 15 μm.

5. The method of claim 1, further comprising forming a protective coating substantially covering the first anode.

6. The method of claim 5, wherein the protective coating comprises silicon dioxide.

7. The method of claim 5, wherein the protective coating comprises alumina.

8. The method of claim 5, wherein the protective coating comprises a ceramic.

9. The method of claim 1, further comprising forming a protective coating substantially covering the second anode.

10. The method of claim 9, wherein the protective coating comprises silicon dioxide.

11. The method of claim 9, wherein the protective coating comprises alumina.

12. The method of claim 9, wherein the protective coating comprises a ceramic.

13. The method of claim 1, wherein the first anode current collector comprises stainless steel or nickel.

14. The method of claim 1, wherein the first cathode current collector comprises stainless steel or nickel.

15. The method of claim 1, wherein the second anode current collector comprises stainless steel or nickel.

16. The method of claim 1, wherein the second cathode current collector comprises stainless steel or nickel.

17. The method of claim 1, further comprising annealing the first cathode at a temperature between about 700° C. and about 800° C.

18. The method of claim 1, further comprising annealing the second cathode at a temperature between about 700° C. and about 800° C.

* * * * *